(12) United States Patent
Levi et al.

(10) Patent No.: US 10,303,760 B2
(45) Date of Patent: May 28, 2019

(54) CASCADING STYLE SHEET META LANGUAGE PERFORMANCE

(71) Applicant: HEWLETT PACKARD ENTERPRISE DEVELOPMENT LP, Houston, TX (US)

(72) Inventors: Elad Levi, Yehud (IL); Avigad Mizrahi, Yehud (IL); Ran Bar Zik, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/128,153

(22) PCT Filed: Apr. 17, 2014

(86) PCT No.: PCT/US2014/034460
§ 371 (c)(1),
(2) Date: Sep. 22, 2016

(87) PCT Pub. No.: WO2015/160351
PCT Pub. Date: Oct. 22, 2015

(65) Prior Publication Data
US 2017/0097927 A1     Apr. 6, 2017

(51) Int. Cl.
*G06F 17/22* (2006.01)
*G06F 17/27* (2006.01)

(52) U.S. Cl.
CPC ........ *G06F 17/272* (2013.01); *G06F 17/2211* (2013.01); *G06F 17/2705* (2013.01)

(58) Field of Classification Search
None
See application file for complete search history.

(56) References Cited

U.S. PATENT DOCUMENTS

| | | |
|---|---|---|
| 7,836,396 B2 | 11/2010 | Becker |
| 8,176,205 B2 | 5/2012 | Sze et al. |
| 8,595,284 B2 | 11/2013 | Sheshagiri et al. |
| 8,615,708 B1 | 12/2013 | Hidayat et al. |
| 8,676,966 B2 | 3/2014 | Podjarny et al. |
| 2008/0168345 A1* | 7/2008 | Becker .............. G06F 17/30896 715/242 |
| 2010/0281357 A1 | 11/2010 | Fu et al. |
| 2012/0278700 A1 | 11/2012 | Sullivan et al. |
| 2013/0013378 A1* | 1/2013 | Norris ................... G06Q 30/02 705/7.38 |
| 2013/0159839 A1 | 6/2013 | Joffray et al. |
| 2013/0290786 A1 | 10/2013 | Artzi et al. |
| 2013/0339844 A1* | 12/2013 | Guzman .............. G06F 17/227 715/235 |

OTHER PUBLICATIONS

Fackler, F., "09.12. 10 Good Reasons Why to Learn a CSS Meta Language Like SASS or Less", (Web Page), Mayflower Blog, Dec. 8, 2011, 10 pages, available at http://blog.mayflower.de/802-09.12.-10-good-reasons-why-to-learn-a-css-meta-language-like-sass-or-less.html.

(Continued)

*Primary Examiner* — Stephen S Hong
*Assistant Examiner* — Sanchita Roy

(57) ABSTRACT

Cascading style sheet (CSS) meta language performance can include inputting a web application and CSS meta language files and removing a redundant CSS selector from the input CSS meta language files.

12 Claims, 3 Drawing Sheets

(56) References Cited

OTHER PUBLICATIONS

Github, Inc., "badsyntax/find-unused-sass-variables.sh," (Web Page), 2014, 2 pages, available at https://gist.github.com/badsyntax/6193491.

Hasather, D., "Style Profiler Preview," (Web Page), Opera Software, Nov. 29, 2011, 3 pages, available at https://dev.opera.com/blog/style-profiler-preview/.

International Search Report & Written Opinion received in PCT Application No. PCT/US2014/034460, dated Dec. 17, 2014, 14 pages.

Less, "Leaner CSS: Java Script Based CSS Meta Language that was Adopted by Microsoft," (Web Page), retrieved on Sep. 20, 7 pages, 2016, available at http://lesscss.org/.

Maezawa, Y. et al., "Automated Verification of Pattern-based Interaction Invariants in Ajax Applications," Automated Software Engineering (ASE), 2013 IEEE/ACM 28th International Conference on, May 18, 2013, 11 pages, available at http://www.washi.cs.waseda.ac.jp/wp-content/uploads/2013/07/ASE2013_bare_conf.pdf.

Mozilla, "Dust-Me Selectors," (Web Page), Firefox Add-ons, 3 pages, retrieved on Sep. 29, 2013, available at https://addons.mozilla.org/en-US/firefox/addon/dust-me-selectors/.

Sass, "Sass (Syntactically Awesome StyleSheets," (Web Page), Mar. 28, 2016, 34 pages, available at http://sass-lang.com/documentation/file.SASS_REFERENCE.html.

unused-css.com, "Unused CSS," (Web Page), 5 pages, retrieved on Sep. 20, 2016, available at https://unused-css.com/.

\* cited by examiner

CASCADING STYLE SHEET META LANGUAGE PERFORMANCE

BACKGROUND

Cascading style sheets (CSS) can be used to describe the look and formatting of a document written in a markup language. CSS can enable the separation of document content from document presentation. CSS meta languages can be used to enhance CSS, and can be rendered by a browser executing the markup language.

DETAILED DESCRIPTION

Recently, cascading style sheet (CSS) meta languages have been used to make CSS files easier to handle. CSS is a language that can be used for describing the look and formatting of a document written in a markup language (e.g., a modern system for annotating a document in a way that is syntactically distinguishable from the text). Currently, CSS meta languages such as syntactically awesome style sheets (SASS) and/or leaner CSS (LESS) have been used to generate CSS files. As used herein, a CSS meta language refers to a semi-programming language that can be interpreted by CSS. CSS meta languages can contain a special syntax and preprocessor script that can compile CSS files that a browser can render (e.g., read). These languages can include functions, variables, and flow control mechanisms that enable proper formatting of CSS files. However, current mechanisms do not allow for removal of obsolete instructions (e.g., code) and/or redundant functions in CSS meta language files. Furthermore, current mechanisms do not allow for the retrieval of information regarding ways to change the CSS meta language files in order to generate more efficient CSS files.

Some mechanisms to identify and remove obsolete instructions and/or redundant functions in CSS files include manual checking and modification of CSS files. Some other mechanisms include removing unused CSS selectors from CSS files, and removing redundant CSS selectors from CSS files. Such mechanisms do not analyze CSS meta language files, do not analyze multiple CSS files, only analyze static CSS files, and do not measure run time performance improvements of revised CSS files. Lastly, some other mechanisms include removing unused SASS variables. However, such mechanisms analyze only variables and do not analyze the output of meta language files. Further, such mechanisms do not analyze code based on a given hypertext markup language (HTML), nor do such mechanisms measure the run time performance improvements of revised CSS files.

In contrast, a number of examples of the present disclosure can provide for improved CSS mega language performance. Examples of the present disclosure can provide a mechanism to identify functions and variables to be removed from CSS meta language files in order to make the instructions easier to maintain, can improve network transfer rates by reducing the CSS file size, and can improve web application loading and handling times by browsers executing the CSS files.

Figure 1:
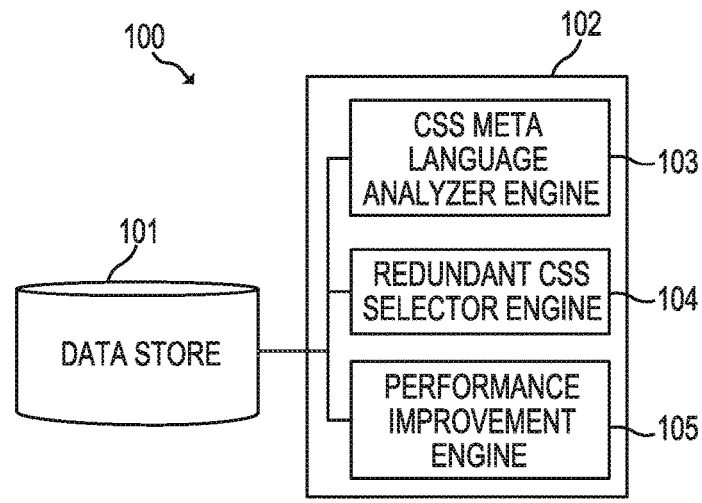
FIG. 1 illustrates a diagram of an example of a system according to the present disclosure.

FIG. 1 illustrates a diagram of an example of a system 100 according to the present disclosure. The system 100 can include a database 101, a subsystem 102, and/or a number of engines (e.g., CSS meta language analyzer engine 103, redundant CSS selector engine 104, and performance improvement engine 105). As used herein, "a" or "a number of" something can refer to one or more such things. For example, "a number of widgets" can refer to one or more widgets. The subsystem can include the number of engines in communication with the database 101 via a communication link. The system 100 can include additional or fewer engines than illustrated to perform the various functions described herein. The system can represent software and/or hardware of a network controller (e.g., device 208 as referenced in FIG. 2, etc.).

The number of engines can include a combination of hardware and programming that is configured to perform a number of functions described herein (e.g., measure a plurality of base performance metrics for a web application based on input CSS meta language files, etc.). The programming can include program instructions (e.g., software, firmware, etc.) stored in a memory resource (e.g., computer readable medium (CRM), machine readable medium (MRM), etc.) as well as hard-wired program (e.g., logic).

The CSS meta language analyzer engine 103 can include a combination of hardware and programming that is configured to measure a plurality of base performance metrics for a web application based on input CSS meta language files. As described herein, CSS is a style sheet language that describes how a web application written in a markup language will look (e.g., color, font style and/or type, etc.). For instance, CSS can be used to define the style of web pages and/or interfaces written in HTML and/or extensible hypertext markup language (XHTML). However, examples are not so limited and CSS can be applied to any kind of extensible markup language (XML) document, including plain XML, scalable vector graphics (SVG) and XML user interface language (XUL).

CSS mega language files input into the CSS meta language analyzer engine 103 can include LESS and/or SASS files. Further, measuring base performance metrics can include measuring a CSS loading time and/or a rendering time (e.g., the amount of time required for a computing program to generate an image from input computing instructions) of the web application using the CSS input. As discussed further herein, the base performance metrics can be measured using a CSS profiler (e.g., a model and/or instructions executable to measure the performance of CSS file execution).

The redundant CSS selector engine 104 can include a combination of hardware and programming that is configured to remove redundant CSS selectors from input CSS meta language files. The redundant CSS selector 104 can analyze the input CSS meta language files, along with the markup language of the web application, and obtain information about redundant CSS selectors. As used herein, a CSS selector refers to a formatting item that identifies which part of the markup document a style applies to. A CSS selector can apply to all elements of a specific type (e.g., all second level headers), to elements specified by attribute (e.g., an identifier unique to the particular markup document, and/or a class), and/or to elements depending on how they are placed relative to, or nested within, other elements in a markup document tree. For example, a CSS selector can apply to the body of a markup document. To identify redundant CSS files, the redundant CSS file engine 104 can compare elements in the markup document against the CSS selectors identified in the CSS meta language files. A redundant CSS selector can include a CSS selector that is not affecting (e.g., is not used by) any element in the markup document. In some examples, the redundant CSS selector may not affect any element in the markup document because it was overridden by other CSS selectors or because the redundant CSS selector does not represent any element used in the markup document (e.g., the CSS selector identifies all second level headers, but no second level headers exist in the markup document).

In some examples, the redundant CSS selector engine 104 can conduct a static analysis (e.g., analysis that is performed without actually executing) of the CSS meta language files and can identify inefficient CSS selectors within the CSS meta language files. For example, the redundant CSS selector engine 104 can identify CSS selectors in the input CSS meta language files that cause the CSS loading time and/or rendering time to decrease below a user defined threshold.

The performance improvement engine 105 can include a combination of hardware and programming that is configured to measure a plurality of performance metrics for a web application in response to removing redundant CSS selector. For instance, the performance improvement engine 105 can measure the loading time and/or rendering time for the web application executing the CSS files, in response to removing redundant CSS selectors. Further, the performance improvement engine 105 can output new CSS meta language files (e.g., the input CSS meta language files having redundant CSS selectors removed and/or inefficient CSS selectors removed and/or replaced). As discussed further herein, the performance improvement engine 105 can analyze the new CSS meta language files (e.g., using a CSS profiler) and compare the loading time and/or rendering time to the base performance metrics recorded by the CSS meta language analyzer engine 103. In some examples, the performance improvement engine 105 can generate a performance improvement summary report identifying the improvement in performance (e.g., improvement in loading and/or rendering time) of the web application executing the CSS files, in response to the new CSS meta language files.

Figure 2:
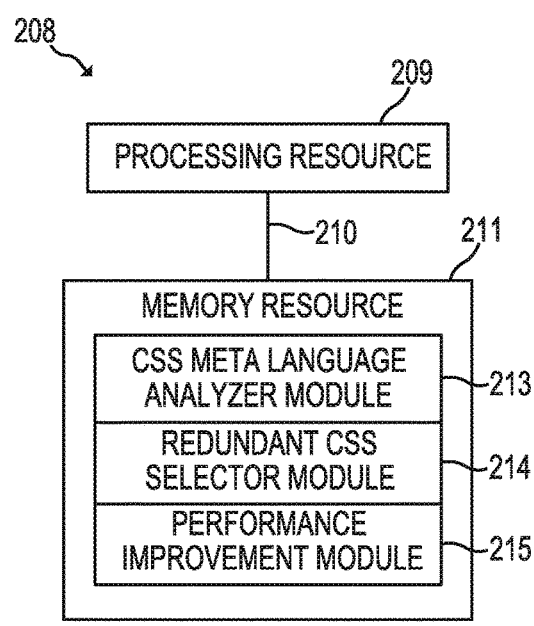
FIG. 2 illustrates a diagram of an example computing device according to the present disclosure.

FIG. 2 illustrates a diagram of an example computing device 208 according to the present disclosure. The computing device 208 can utilize software, hardware, firmware, and/or logic to perform a number of functions described herein. The computing device 208 can be any combination of hardware and program instructions configured to share information. The hardware, for example, can include a processing resource 209 and/or a memory resource 211 (e.g., CRM, MRM, database, etc.). A processing resource 209, as used herein, can include any number of processors capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., remove a redundant CSS selector from input CSS meta language files).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules (e.g., CSS meta language analyze module 213, redundant CSS selector module 214, performance improvement module 215) can include CRI that when executed by the processing resource 209 can perform a number of functions. The number of modules can be sub-modules of other modules. For example, the CSS meta language analyzer module 213, the redundant CSS selector module 214, and the performance improvement module 215 can be sub-modules and/or contained within the same computing device. In another example, the number of modules can comprise individual modules at separate and distinct locations (e.g., CRM, etc.).

Each of the number of modules can include instructions that when executed by the processing resource 209 can function as a corresponding engine as described herein. For example, the CSS meta language analyzer module 213 can include instructions that when executed by the processing resource 209 can function as the CSS meta language analyzer engine 103. In another example, the redundant CSS selector module 214 can include instructions that when executed by the processing resource 209 can function as the redundant CSS selector engine 104. Additionally, the performance improvement module 215 can include instructions that when executed by the processing resource 209 can function as the performance improvement engine 105.

The CSS meta language analyzer module 213 can include instructions that when executed by the processing resource, can identify a function and a variable that generate a redundant CSS selector among input CSS meta language files associated with a web application. As described in relation to FIG. 1, a redundant CSS selector can include a CSS selector that is not affecting (e.g., is not used by) any element in the markup document. In response to receiving an input of a web application (e.g., a uniform resource locator for a particular website and/or source code for the particular web application), as well as CSS meta language files (e.g., SASS and/or LESS files, among others) associated with the web application, the CSS meta language analyzer module 213 can use a CSS profiler to measure base performance metrics of the web application and CSS meta language files. The CSS meta language analyzer module 213 can subsequently identify redundant CSS selectors in the CSS meta language files by mapping each CSS selector used in the CSS meta language files to an element and/or a plurality of elements in the web application (e.g., the HTML for the particular web application). By mapping each CSS selector to the web application, the CSS meta language analyzer module 213 can identify functions and/or variables (e.g., attributes and/or values) associated with redundant CSS selectors in the CSS meta language files. As used herein, a function refers to a reusable block of instructions (e.g., code) that carries out a specific task. To execute the instructions in a function, a user can "call" the function (e.g., instruct a processor to perform the instructions).

The redundant CSS selector module 214 can include instructions that when executed by the processing resource can remove the functions and/or variables that generate redundant CSS selectors from input CSS meta language files. In some examples, the redundant CSS selector module 214 can further scan (e.g., search and/or analyze) the CSS meta language files in order to identify redundant functions and/or variables that generate redundant CSS selectors.

In some examples, the computing device 208 can include a performance modification module (not illustrated in FIG. 2). The performance modification module can include instructions that when executed by the processing resource can identify inefficient CSS instructions (e.g., code) in input CSS meta language files, and replace the inefficient CSS instructions with efficient CSS instructions that improve performance values above a user defined threshold. As used herein, inefficient CSS instructions include instructions in CSS meta language files that result in performance values for a web application that are below a user defined threshold. For example, a CSS meta language file can include a symbol, such as an asterisk (e.g., "*"), associated with a particular CSS selector. The symbol can result in an increased loading and/or rendering time for the associated CSS file (e.g., increased above a user defined threshold of time), and can therefore be identified as an inefficient CSS instruction. In such an example, the performance modification module can replace the symbol with efficient CSS instructions (e.g., simplified and/or explicit CSS instructions that result in a decreased loading and/or rendering time for the associated CSS file). For instance, the performance modification module can replace the "*" with an explicit phrase such as "body" to more clearly identify a particular CSS selector.

The performance improvement module 215 can include instructions that when executed by the processing resource can generate new CSS meta language files. As used herein, new CSS meta language files can refer to the input CSS meta language files (e.g., input to the CSS meta language analyzer module 213), that have been modified to remove redundant CSS selectors and/or inefficient CSS instructions, and to include efficient CSS instructions, when applicable. In some examples, the performance improvement module 215 can return a performance improvement summary report to a user of computing device 208 describing the modifications made to the input CSS meta language files, and the improvement in performance (e.g., rendering and/or loading time) as a result of those modifications.

Figure 3:
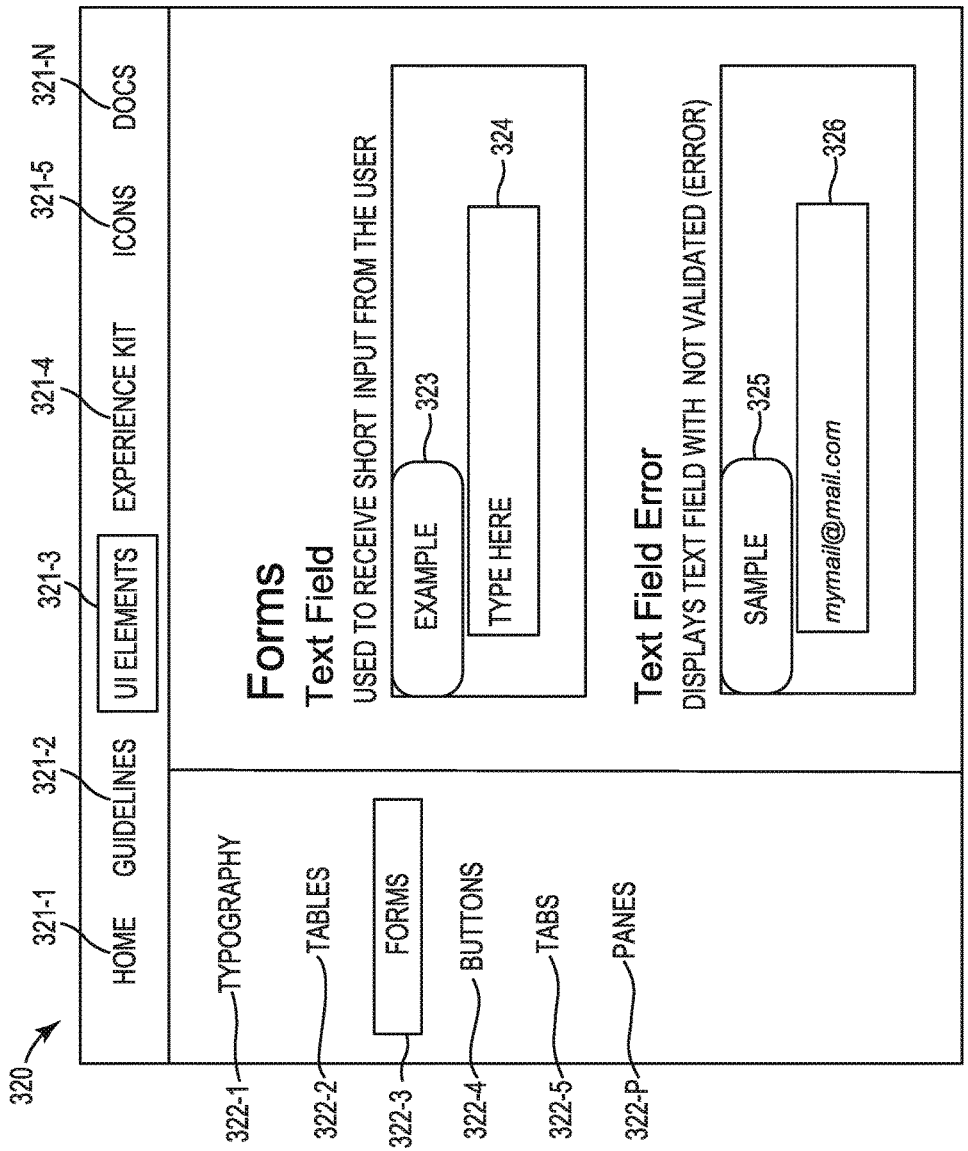
FIG. 3 illustrates an environment for a CSS meta language analyzer according to the present disclosure.

FIG. 3 illustrates an environment 320 for a CSS meta language analyzer according to the present disclosure. Environment 320 can include a graphical user interface (GUI) displaying a web application (e.g., a HTML document). The uniform resource locator (URL) of the web application can be input to the CSS meta language analyzer engine 103 and/or the CSS meta language analyzer module 213, as discussed in relation to FIGS. 1 and 2, respectively. Also, the corresponding CSS meta language files (e.g., SASS and/or LESS code) associated with the web application can be input to the CSS meta language analyzer engine 103 and/or the CSS meta language analyzer module 213. In the example illustrated in FIG. 3, the web application includes a number of groups 321-1, 321-2, 321-3, . . . , 321-N and categories 322-1, 322-2, 322-3, . . . , 322-P that can be formatted by CSS files. As illustrated in FIG. 3, the group "UI elements" (e.g., 321-3) can be selected, and the category "Forms" (e.g., 322-3) can be designed by CSS files. Within the Forms category, a number of elements can be formatted. For instance, tabs "Example" (e.g., 323) and "Sample" (e.g., 325), as well as text fields "type here" (e.g., 324) and mymail@mail.com 326 are elements within environment 320 that can be formatted by CSS files and/or CSS meta language files.

In an example, tab "Example" (e.g., 323) can be designed by CSS meta language files. In such an example, the "Example" tab can be formatted by the following CSS selector:

```
article .example {
    background-color: gray;
    font-family: arial;
    font-color: silver;
}
```

That is, the CSS selector of "article.example" is being defined by three properties (e.g., attributes): background-color, font-family, and font-color. Further, the three properties have values assigned to them of: gray, arial, and silver, respectively.

The selector section of the CSS instructions defines what markup language document (e.g., HTML) element(s) the property applies to (e.g., the body, the title, an example box, etc.). The property section of the CSS instructions defines a property and/or quality of the markup language document element(s). In the example illustrated in FIG. 3, the "Example" tab will then be displayed with a gray background color, and with silver arial font.

CSS files can be generated by CSS meta language files. For example, CSS files can be generated using CSS meta language files such as SASS and/or LESS, among others. In the example illustrated in FIG. 3, the CSS file formatting the "Example" tab 323 can be generated by a SASS mixin (e.g., a function used by SASS CSS meta language files). For instance, the SASS mixin for the above example can be:

```
@mixin page-title {
    background-color: $universal__background;
    font-family: arial;
    font-color: $universal__color;
}
```

Further, the SASS mixin illustrated above can be called by the following command:

```
article .example {
    @include page-title( );
}
```

In the example illustrated in FIG. 3, a user may wish to remove the "Example" tab (e.g., 323) from the web application (e.g., environment 320). However, when the user removes the "Example" tab 323, the corresponding CSS code may need to be removed as well. Using the CSS meta language analyzer engine 103 and/or the CSS meta language analyzer module 213, every page of the web application can be scanned and redundant CSS selectors can be identified.

For example, the CSS meta language analyzer module 213 can identify the following CSS selector as a redundant CSS selector:

```
article .example {
    background-color: gray;
    font-family: arial;
    font-color: silver;
}
```

The "article .example" CSS selector could be identified as a redundant CSS selector because after the user removed the "Example" tab 323 from the web application, the "article .example" CSS selector did not correspond to any element in the web application. While the foregoing example illustrates a single redundant CSS selector being identified, examples are not so limited, and a plurality of redundant CSS selectors can be identified. The redundant CSS selector engine 104 and/or the redundant CSS selector module 214 can then remove the identified redundant CSS selectors from the CSS file.

Further, redundant CSS selector engine 104 and/or the redundant CSS selector module 214 can scan the input CSS meta language files input with the web application and identify functions associated with the identified redundant CSS selectors. For example, the redundant CSS selector engine 104 and/or the redundant CSS selector module 214 can scan the input CSS meta language files and identify the following call in SASS:

```
article .example {
    @include page-title( );
}
```

Similarly, redundant CSS selector engine 104 and/or the redundant CSS selector module 214 can identify that the function page-title( ) was declared in the following SASS mixin:

```
@mixin page-title {
    background-color: $universal_background;
    font-family: arial;
    font-color: $universal_color;
}
```

Because the identified SASS call and SASS mixin were associated with the redundant CSS selector "article .example", and they are not used anywhere else in the web application (e.g., environment 320), the redundant CSS selector engine 104 and/or the redundant CSS selector module 214 can remove both the SASS call (e.g., to the page-title function) and the SASS mixin (e.g., the page-title function itself) illustrated above.

As discussed in relation to FIG. 2, inefficient CSS instructions (e.g., code) can be identified in some examples. A performance modification engine and/or performance modification module can static analyze input CSS meta language files and identify inefficient CSS instructions. For instance, the performance modification engine and/or performance modification module can identify the following inefficient CSS instructions:

```
*. text-header{
    font-size: 13px;
}
```

In the above example, the "*" patter can be identified as an inefficient CSS instruction because it results in an increased rendering time for the web application (e.g., environment 320). In response to being identified as an inefficient CSS instruction, the performance modification engine and/or the performance modification module can replace the inefficient CSS instructions with the following efficient CSS instructions:

```
body. text-header{
    font-size: 13px;
}
```

As discussed in relation to FIGS. 1 and 2, the performance improvement engine 105 and/or the performance improvement module 215 can output new CSS meta language files (e.g., the input CSS meta language files having redundant CSS selectors removed and/or inefficient CSS selectors removed and/or replaced). In the example discussed above, new CSS meta language files can be output including the "body. text-header" instructions, and not including the "article .example" CSS selector, the SASS call (e.g., to the page-title function) and the SASS mixin (e.g., the page-title function itself). The performance improvement engine 105 and/or the performance improvement module 215 can also send a performance improvement summary report to a user of environment 320 outlining the modifications made, as well as the improvement in performance realized as a result of the modifications.

Figure 4:
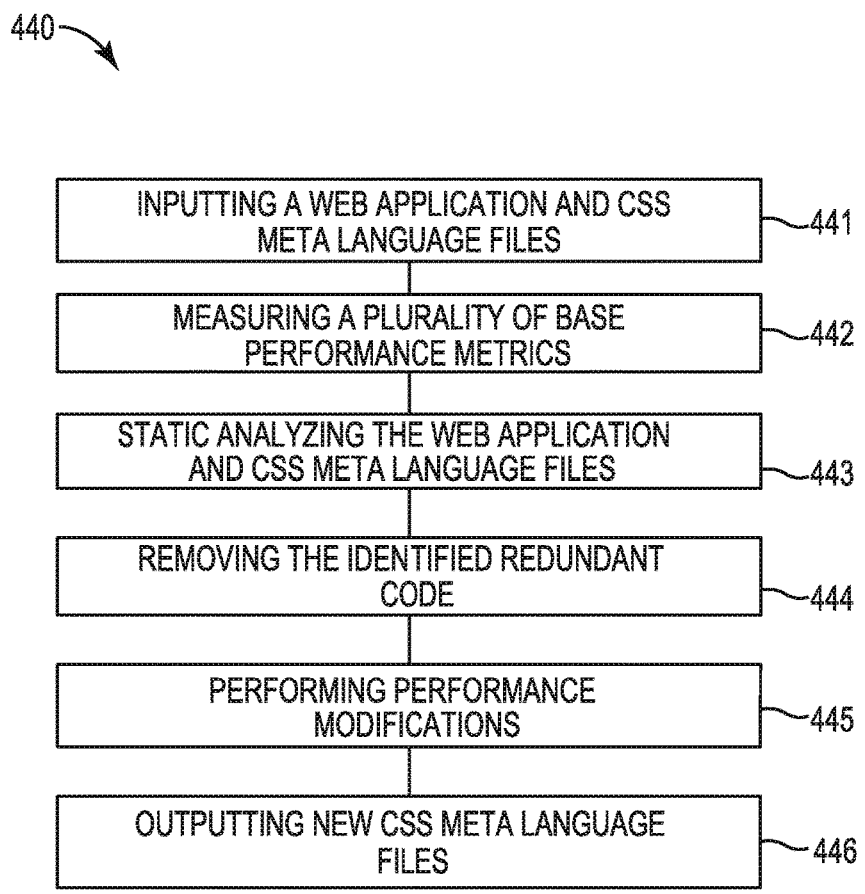
FIG. 4 illustrates a flow chart of a method according to the present disclosure.

FIG. 4 illustrates a flow chart of a method 440 according to the present disclosure. At 441, the method 440 can include inputting source code for a web application and CSS meta language files into a CSS meta language analyzer. For example, an input can be a site URL and/or source code for a particular web application to be analyzed and its corresponding SASS code. Examples are not so limited, however, and CSS As described further herein, CSS meta language files are the instructions (e.g., code) of the given application's CSS). For instance, the meta language files can include LESS and SASS files, among others CSS meta language file types.

At 442, the method 440 can include measuring a plurality of base performance metrics for the web application. Once a browser loads an HTML, then it loads the CSS files, then after the CSS files are loaded, the page can be displayed to an end user. The loading time of the CSS may change based on the size of the CSS file and also the efficiency of the CSS instructions. That is, the size of the CSS file and the efficiency of the CSS instructions both affect the speed of the site. The performance can be measured by numerical values (e.g., speed as a numerical value). CSS profilers, such as Opera style profiler, can be used to measure the CSS loading and/or rendering time of the web application, based on the input of the web application and the CSS meta language files. Examples are not so limited, however, and any CSS profiler can be used.

At 443, the method 440 can include static analyzing the CSS files along with the markup language document (e.g., HTML) of the web application to identify redundant CSS selectors in the CSS meta language files. For example, identifying redundant CSS selectors can include analyzing input CSS meta language files (e.g., SASS and/or LESS files) and the associated HTML associated with the web application, comparing CSS selectors in the CSS meta language files with elements in a hypertext markup language (HTML) document associated with the web application and identifying CSS selectors that do not affect any elements in the HTML.

At 444, the method 440 can include removing identified redundant CSS selectors from the CSS meta language files. Redundant CSS selectors can be removed from the CSS meta language files in response to being identified as redundant CSS selectors. Additionally, functions and variables in the CSS meta language files that generate the redundant CSS selectors can also be removed. For example, the method 440 can include analyzing a CSS file, removing redundant CSS selectors from the CSS file and/or CSS meta language files, and subsequently identifying and removing functions and variables associated with the redundant CSS selector.

At 445, the method 440 can include performing performance modifications in the CSS meta language files. Performing performance modifications can include mimicking (e.g., executing in a test environment) operation of the CSS meta language files and identifying sections of the CSS meta language files that can be revised to increase performance of the web application. For example, a set of user-defined patterns can be specified that identify inefficient instructions. As described above, a CSS selector of "*" rather than a CSS selector of "body" is an example of a user-defined pattern that identifies an inefficient instruction. Further examples of inefficient instructions can include the following (the nomenclature "some_id" and "someClass" being generic terms that could refer to any identifier and/or any class, respectively):

```
*#some_id
div#some_id
.someClass .someClass
```

Performing performance modifications can include searching for the user-defined patterns in the instructions in the CSS meta language files and replacing the inefficient instruction(s) with efficient instruction(s). For instance, the above examples of inefficient instructions can be replaced with the following efficient instructions:

```
#some_id
#some_id
.someClass > .someClass
```

At 446, the method 440 can include outputting new CSS meta language files, not including the identified redundant CSS selectors and including the performance modifications. Further, a performance improvement summary report can be outputted, listing the redundant CSS selectors removed, and performance modifications made (e.g., what CSS instructions were removed and/or changed in order to improve performance). In some examples, a CSS profiler (e.g., Opera style profiler) can be used to run a second performance analysis (e.g., subsequent to the base performance measurements) in order to compare the performance of the web application with the new CSS meta language files against the performance of the web application with the original (e.g., input) CSS meta language files. The results of the second performance analysis can be described in the performance improvement summary report provided to a user of the web application and/or CSS meta language analyzer.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", and "P", particularly with respect to reference numerals in the drawings, indicate that a number of the particular feature and/or component so designated can be included with a number of examples of the present disclosure. The designators "N" and "P" can refer to a same feature and/or component, or different features and/or components.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
   a processor; and
   a non-transitory computer readable medium storing machine readable instructions, wherein the processor executes the machine readable instructions to:
   measure a plurality of base performance metrics for a web application based on input cascading style sheet (CSS) meta language files;
   remove a redundant CSS selector from the input CSS meta language files;
   conduct a static analysis of the input CSS meta language files and identify an inefficient CSS selector within the input CSS meta language files, wherein the static analysis is performed without actual execution of the CSS meta language files;
   identify an inefficient function, variable or instruction that is associated with the inefficient CSS selector;
   replace the inefficient CSS selector in the input CSS meta language files with an efficient CSS selector, wherein the efficient CSS selector is a simplified CSS selector that results in decreased loading or rendering times and improves performance values above a user-defined threshold;

replace the inefficient function, variable or instruction associated with the inefficient CSS selector with a corresponding efficient function, variable or instruction;

perform performance modifications in the CSS meta language files, wherein the performance modifications include searching for user-defined patterns in the input CSS meta language files, executing the input CSS meta language files in a test environment, and replacing an inefficient instruction of the input CSS meta language files with an efficient instruction, wherein the efficient instruction improves at least one of the performance values; and measure a plurality of performance metrics for the web application in response to removing the redundant CSS selector, replacing the inefficient CSS selector, replacing the inefficient function, variable or instruction associated with the inefficient CSS selector, and performing the performance modifications.

2. The system of claim 1, wherein the input CSS meta language files include syntactically awesome style sheet (SASS) files.

3. The system of claim 1, wherein the input CSS meta language files include leaner CSS (LESS) files.

4. The system of claim 1, wherein the base performance metrics include a loading time or a rendering time of the web application.

5. A non-transitory computer readable medium storing instructions executable by a processing resource to cause a computer to:

identify, using a cascading style sheet (CSS) meta language analyzer, a function and a variable that generate a redundant CSS selector among input CSS meta language files associated with a web application;

remove the function and variable that generate the redundant CSS selector from the input CSS meta language files;

conduct a static analysis of the input CSS meta language files and identify inefficient CSS instructions associated with the redundant CSS selector in the input CSS meta language files, wherein inefficient CSS instructions include instructions in the CSS meta language files that result in performance values for the web application that are below a user-defined threshold and wherein the static analysis is performed without actual execution of the CSS meta language files;

replace the inefficient CSS instructions in the input CSS meta language files with efficient CSS instructions, wherein the efficient CSS instructions are simplified CSS instructions that result in decreased loading or rendering times and improve performance values above the user-defined threshold;

perform performance modifications in the CSS meta language files, wherein the performance modifications include searching for user-defined patterns in the input CSS meta language files, executing the input CSS meta language files in a test environment, and replacing an inefficient instruction of the input CSS meta language files with an efficient instruction, wherein the efficient instruction improves at least one of the performance values; and generate new CSS meta language files not including the redundant CSS selector, including the efficient CSS instructions, and in response to performing the performance modifications.

6. The non-transitory machine readable medium of claim 5, wherein the redundant CSS selector includes a CSS selector that does not correlate to any elements in a markup document associated with the web application.

7. The non-transitory machine readable medium of claim 5, wherein the input CSS meta language files include syntactically awesome style sheet (SASS) files and leaner CSS (LESS) files.

8. The non-transitory machine readable medium of claim 7, wherein the instructions executable to identify a function and a variable that generate a redundant CSS selector includes instructions to search for the redundant CSS selector among the SASS files and the LESS files.

9. A method, comprising:

inputting source code for a web application and cascading style sheet (CSS) meta language files into a CSS meta language analyzer;

measuring a plurality of base performance metrics for the web application;

static analyzing, using the CSS meta language analyzer, the web application and the CSS meta language files to identify redundant CSS selectors in the CSS meta language files;

identifying a redundant function, variable or instruction that is associated with one of the redundant CSS selectors;

removing the identified redundant CSS selectors from the CSS meta language files;

removing the redundant function, variable or instruction that is associated with the one of the redundant CSS selectors that results in decreased loading or rendering times and improves performance values above a user-defined threshold;

performing performance modifications in the CSS meta language files, wherein performing performance modifications includes:

searching for user-defined patterns in the CSS meta language files;

executing the CSS meta language files in a test environment; and replacing an inefficient instruction of the input CSS meta language files with an efficient instruction, wherein the efficient instruction improves at least one of the performance values; and outputting new CSS meta language files, not including the identified redundant CSS selectors and including the performance modifications.

10. The method of claim 9, wherein the base performance metrics include a CSS rendering time of the web application.

11. The method of claim 9 wherein identifying redundant CSS selectors includes comparing CSS selectors in the CSS meta language files with elements in a hypertext markup language (HTML) document associated with the web application and identifying CSS selectors that do not affect any elements in the HTML.

12. The method of claim 9, including analyzing the performance of the new CSS meta language files and comparing the results of the analysis against the base performance metrics.

* * * * *